United States Patent Office 3,031,051
Patented Apr. 24, 1962

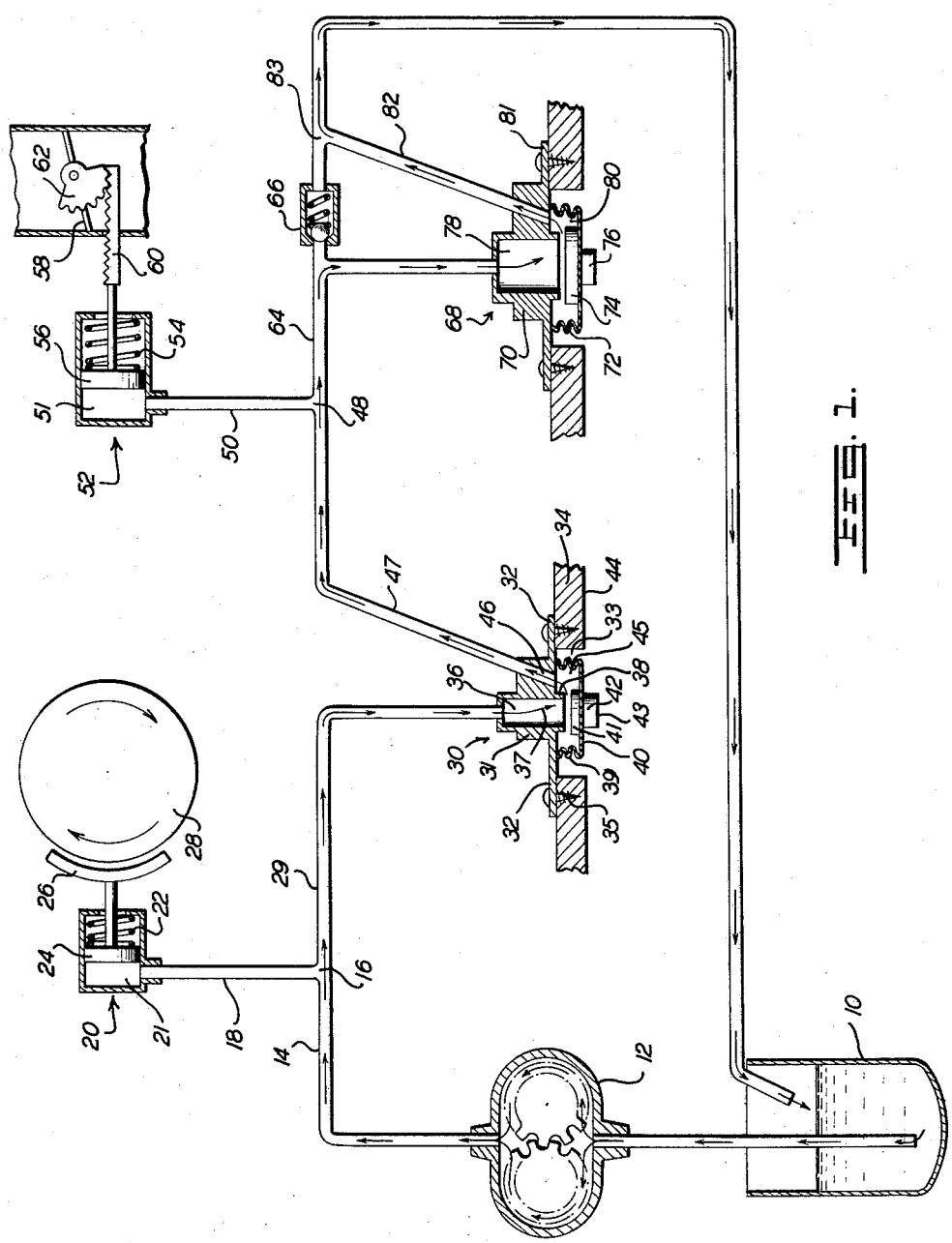

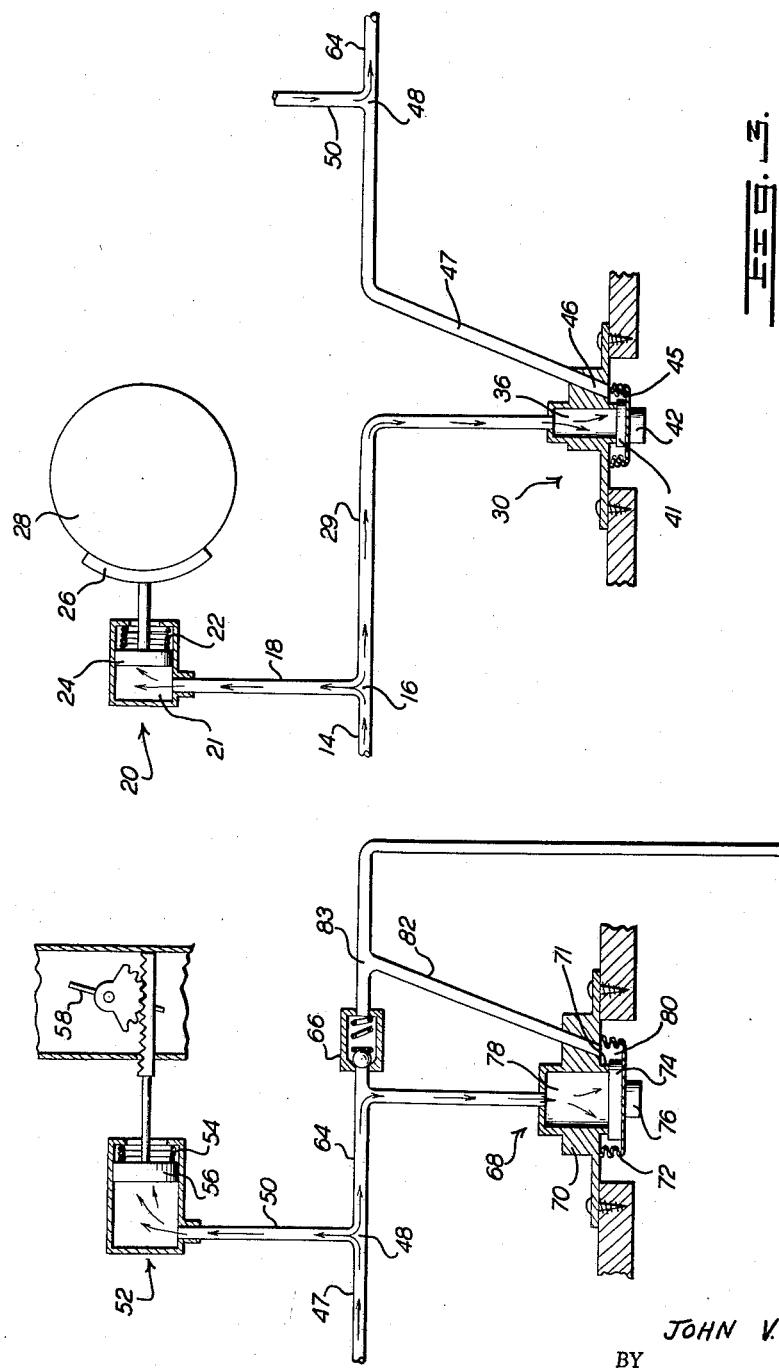

3,031,051
BRAKE AND THROTTLE HYDRAULIC CONTROL
John V. Huff, Harper Woods, Mich., assignor to General Motors Corporation, Detroit, Mich., a corporation of Delaware
Filed Jan. 30, 1959, Ser. No. 790,232
12 Claims. (Cl. 192—3)

This invention relates to a vehicle throttle and brake control apparatus and more particularly to an hydraulic control system for actuating such apparatus.

Recent changes in vehicle structure have greatly improved performance and appearance. However, the vehicle control systems presently used are not well adapted for the modern automobile because of space limitations and design considerations. A need has developed for vehicle control apparatus of a more simplified nature which is consonant with contemporary design principles and functionally superior to mechanical linkage arrangements.

It has been recognized that hydraulic control systems are superior to mechanical systems and some attempts have been made to operate a brake or other control through a fluid system. The previous fluid control apparatus have not provided an integrated vehicle control system which could be economically adapted to present vehicle structure nor which would provide positive reaction forces transmitted directly to the vehicle operator to maintain the operator's "sense of control" required for safe vehicle operation.

When a brake and a throttle are to be controlled, it is of course important that the operation of the brake be independent of the throttle operation. In fact, usually the most desirable arrangement is one wherein the brake and throttle are controlled completely independently of one another. This ordinarily requires a separate vehicle operator manipulatable linkage for each control. The present invention utilizes a single control relay mechanism, a fluid system, without sacrificing control independence or responsiveness. The control elements and the control pedals may be made integral and mounted flush with the adjacent wall of the operator's compartment. Space limitations in most vehicle make it desirable to provide control mechanism which will occupy a minimum of space in the operator's compartment and in the area wherein the linkage connections to the controlled elements are usually accomplished. It is desirable to maintain the "feel" of the actuated mechanism through the manual control in order that the operator will be aware of the force applied to the controlled mechanism. Thus, an hydraulic control system is well suited for this purpose.

The objects of this invention are to provide an improved hydraulic control system for throttle and brake apparatus which features; a plurality of control means in series in a single flow line, control mechanism which utilizes the simple construction of a check valve, a safety mechanism which prevents simultaneous operation of a vehicle's brake and throttle, and flush-mounted pedal controls.

With the above and other objects in view, the invention resides in the features hereinafter set forth and more particularly pointed out in the appended claims. In describing the invention in detail, reference will be had to the accompanying drawings wherein like characters denote like or corresponding parts throughout the several views and in which:

FIGURE 1 is a diagrammatic view showing the overall system embodying the present invention;

FIGURE 2 is a diagrammatic view of the throttle portion of the system of FIGURE 1; and FIGURE 3 is a diagrammatic view of the brake portion of the system of FIGURE 1.

Referring now to FIGURE 1, a suitable hydraulic fluid such as oil is maintained in the system by a reservoir 10. A standard type oil pump 12 is connected by the flow line 14 to a junction 16. A brake branch line 18 connects at this junction and provides a passage for fluid to a brake servo motor 20. The servo motor comprises a fluid chamber 21 in which a servo piston 24 is adapted to reciprocate. The piston 24 is connected to a brake shoe 26 that is adjacent to and movable into contact with a brake drum 28. The piston 24 is normally biased by a strong brake release spring 22 against the pressure of the fluid in the chamber 21 to a position wherein the brake shoe 26 does not engage the brake drum 28.

The other branch flow line 29 continues from the junction 16 to the brake control mechanism 30. The brake control mechanism 30 includes a main housing 31 which has a flange 32 extending radially outwardly about its periphery. An aperture 33 is provided in the vehicle wall 34, the latter serving as a foot rest for the vehicle operator.

The main housing 31 is aligned with the aperture 33 and secured to the vehicle wall 34 by any suitable means such as a plurality of circumferentially spaced screws or bolts 35 passing through the flange 32. The main housing 32 is provided with a central inlet chamber 36 which communicates with the flow line 29 at one end and which is provided at the other end with an opening 37 defined by a flange extension 38 of the main housing 31. A flexible bag-like member or annulus 39 having a larger diameter than the central chamber 36 is secured about the periphery of its open end in any suitable fluid sealing manner to the main housing 31 radially outwardly of the flange extension 38. The end wall 40 of the flexible member 39 supports an inwardly extending cylindrical valve member 41 in coaxial alignment with the opening 37. The diameter of the valve member 41 is sufficiently larger than the opening 37 so that the opening is closed when the valve member 41 is seated against the flange extension 38 which extension provides a valve seat. The end wall 40 also supports an outwardly extending pedal or button 42 that is adapted to protrude through the vehicle wall 34 very slightly so that a foot engaging portion 43 of the button 42 is mounted substantially flush with the inner surface 44 of the vehicle wall 34. Thus, the operator's control is integral with the actual control valve means. The flexible bag-like member 39 and the main housing 31 form a fluid outlet chamber 45. A passage 46 in the main housing 31 communicates with the chamber 45 between the flange extension 38 and the sealed periphery of the bag 39.

A flow line 47 leads from the passage 46 to a second junction 48 from which a flow passage 50 communicates with a fluid chamber 51 of a throttle actuating servo motor 52. A relatively weak throttle release spring 54 biases a reciprocable piston 56 and opposes the force of hydraulic fluid in the chamber 51. The spring 54 is of such strength as to be compressible by lesser forces than the spring 22. The piston 56 is suitably connected to a throttle 58 by a linkage such as a rack 60 and a gear 62.

The junction 48 communicates with a second flow line 64 provided with a suitable pressure relief valve 66. The relief valve 66 is adapted to open in response to a pressure greater than the force required to actuate the throttle spring 54, but less than the force required to actuate the brake spring 22.

The flow passage 64 leads to the throttle control mechanism 68 which is constructed in a manner similar to the brake control mechanism 32 in that it is provided with a housing 70, a flexible bellow-like member 72, a valve 74, a control button 76, an inlet chamber 78, and attaching flange extensions 81. A return flow line 82 leads from the outlet chamber 80 to the reservoir 10. The pressure relief valve 66 is also connected with the return line 82 at junction 83. The inlet chamber 78 is larger than the brake control inlet chamber 36 to provide a larger reaction surface for the throttle valve 74.

In operation, as shown in FIGURE 1 wherein the brake 26 is released and the throttle 58 is partially actuated, hydraulic fluid is circulated through the system by the pump 12. The fluid flows through the brake control mechanism 30 and through the throttle control mechanism 68; and fills the fluid chambers 21 and 51 of the brake and throttle actuators. The pressure created by normal fluid flow is insufficient to overcome the bias of the actuator springs 22 and 54. When the throttle valve 74 is partially depressed, fluid flow is restricted to cause a pressure build-up in the system which actuates the piston 56 against the bias of the spring 54 to partially open the throttle 58. Since the throttle spring 54 is weaker than the brake spring 22, the brake 26 will not be actuated by any fluid pressures in the throttle actuating range.

FIGURE 2 shows the throttle portion of the system when the fuel control valve 74 is pushed in against the valve seat 71 to restrict fluid flow. As the valve 74 is pushed in by applying pressure to the pedal 76, the flow of oil from the inlet chamber 78 to the outlet chamber 80 is restricted causing fluid pressure to build up in the lines 47, 50, and 64. This build-up in pressure causes the servo motor 52 to operate by moving the piston 56 against the bias of the spring 54 to open the throttle valve 58. The spring 54 is relatively weak so that the throttle may be opened by small changes in fluid pressure caused by the flow restricting throttle valve control. Although restriction of fluid flow by operation of the valve 74 will also cause a pressure build-up in the lines 14, 18 and 29, no movement of the brake servo piston 24 will occur since the spring 22 is sufficiently strong relative to the throttle spring 54 to resist any pressure build-up obtained when the throttle system is actuated. The pressure required to open the relief valve 66 is set to a value greater than the force necessary to operate the throttle spring 54, but less than the force required to actuate the brake spring 22. Therefore, even though the throttle control valve 74 is completely closed, the brake servo 20 will not be actuated.

In FIGURE 3, which shows the brake control valve 41 completely closed, fluid pressure build-up in the inlet chamber 36, lines 18 and 29, and the servo chamber 21, actuates the servo piston 24 to apply the brake shoe 26. The brake shoe 26 is applied proportionately to the pressure exerted by the operator against the valve 41 through the button 42. The pressure increases quickly because there is no other outlet for the hydraulic fluid being supplied from the pump 12. However, a by-pass may be placed in the system between the control mechanism 30 and the servo motor 20. The brakes will be lightly or heavily applied in proportion to the restriction caused by the valve 41 and the operator will have proportionate "feel" at all times. When the valve 41 is depressed, flow is reduced or stopped in the line 47 thereby reducing fluid pressure available to the throttle servo 52 and automatically causing the throttle to close when the brake is applied. Thus, it will be seen that the throttle operation is independent of the brake operation because of the difference in relative pressures necessary to operate the brake servo and the throttle servo.

While only one illustrative embodiment of the invention has been shown and described herein, various other modifications are possible within the purview of the invention; and the invention is intended to be limited only by the spirit and scope of the appended claims.

What is claimed is:

1. A vehicle control apparatus comprising a closed fluid circulating system, a brake actuating mechanism in said system responsive to controlled fluid pressures, a throttle actuating mechanism in said system responsive to controlled fluid pressures, and means in said system for independently controlling fluid pressure at one of said mechanisms.

2. The control apparatus as described in claim 1 wherein said means comprise for each of said mechanisms a flexible bellows defining a fluid chamber in said system and a fluid flow restricting valve in said fluid chamber and integrally associated with said bellows to control fluid pressures in said system.

3. In a vehicle control apparatus, an hydraulic system comprising in series in a flow path a pump circulating fluid under pressure, a pressure responsive brake actuating mechanism, a first flow regulating means for variably restricting fluid flow in said flow path, a pressure responsive throttle actuating mechanism, a second flow regulating means for variably restricting fluid flow in said flow path, and means in said system limiting the range of response of said brake mechanism to pressures above the maximum operating pressure of said throttle actuating mechanism.

4. A vehicle control apparatus comprising a closed fluid circulating system, a brake actuating mechanism in said system responsive to controlled fluid pressures, a throttle actuating mechanism in said system responsive to controlled fluid pressures of a smaller value than the pressures required to actuate said brake actuating mechanism, and means for independently controlling fluid pressure at one of said mechanisms.

5. In a control apparatus having means for circulating fluid under pressure in a continuous flow path comprising in series in the flow path, a pressure responsive brake actuating mechanism, a brake control valve for interrupting the fluid flow to cause a brake actuating fluid pressure increase, a pressure responsive throttle actuating mechanism, a throttle control valve for interrupting fluid flow to cause a throttle actuating fluid pressure increase, and means controlling said throttle actuating mechanism, said last means being responsive to lesser pressures than said brake mechanism whereby the mechanisms are adapted to operate independently of one another.

6. In a control apparatus having means for circulating fluid under pressure in a continuous flow path comprising in series, a pressure responsive brake actuating mechanism, a brake release spring in said mechanism tending to bias said brake actuating mechanism to an inoperative position, a brake control valve for interrupting fluid flow to cause a brake actuating fluid pressure increase, a pressure responsive throttle actuating mechanism, a throttle release spring in said throttle actuating mechanism tending to bias said throttle actuating mechanism to an inoperative position, said throttle release spring being compressible through a range of pressure having a maximum value less than the minimum brake actuating pressure, a throttle control valve for interrupting fluid flow to cause a throttle actuating fluid pressure increase, and a by-pass valve in parallel with said throttle control valve and responsive to fluid pressures having a value greater than the maximum throttle actuating pressure.

7. In a vehicle having controls mounted on a wall of said vehicle, the combination of an hydraulic system having a series, a pump circulating fluid under pressure, pressure responsive brake actuating mechanism, a brake control valve for restricting fluid flow to cause a brake actuating pressure increase, throttle actuating mechanism responsive to lesser fluid pressures than said brake actuating mechanism, a throttle control valve for restricting fluid flow to cause a throttle actuating fluid pressure increase, and a pedal operatively associated with each of said valves and extending through said vehicle wall, the foot engageable portion of said pedal being substantially flush with the interior surface of said vehicle wall.

8. The control apparatus as described in claim 3 wherein said first and second flow regulating means comprises a housing having a fluid inlet chamber, support means extending about the periphery of said housing, a valve seat formed by an opening at one end of the inlet chamber, a bag-like flexible member having its open end secured to said housing radially outwardly of said valve seat to form a fluid outlet chamber enclosing said valve seat, a valve supported by the end of said flexible member within said outlet chamber and adapted to control fluid flow from said inlet chamber to said outlet chamber, a fluid outlet passage in said housing connected to said outlet chamber radially outwardly from said inlet chamber, and a valve control member extending outwardly from the end of said flexible member.

9. The control apparatus as described in claim 5 having a first fluid flow orifice associated with said brake control valve and a second fluid flow orifice of larger diameter associated with said throttle control valve.

10. A vehicle control apparatus comprising a closed fluid circulating system, a brake actuating mechanism in said system responsive to controlled fluid pressures, first means for controlling fluid pressure at said brake actuating mechanism, a throttle actuating mechanism in said system responsive to controlled fluid pressures, second means for controlling fluid pressure at said throttle actuating mechanism, said first means controlling the fluid pressure at said brake mechanism independently of the fluid pressure at said throttle mechanism.

11. The control apparatus as described in claim 10 wherein said first and second controlling means comprise for each of said mechanisms a flexible bellows defining a fluid chamber in said system and a fluid flow restricting valve in said fluid chamber and integrally associated with said bellows to control fluid pressures in said system.

12. A vehicle control apparatus comprising a closed fluid circulating system, a brake actuating mechanism in said system responsive to controlled fluid pressures, first means for controlling fluid pressure at said brake actuating mechanism, a throttle actuating mechanism in said system responsive to controlled fluid pressures of a smaller value than the pressures required to actuate said brake actuating mechanism, second means for controlling fluid pressure at said throttle actuating mechanism, said first means controlling the fluid pressure at said brake mechanism independently of the fluid pressure at said throttle mechanism.

References Cited in the file of this patent

UNITED STATES PATENTS

| | | |
|---|---|---|
| 1,991,202 | Flamini | Feb. 12, 1935 |
| 2,020,640 | Guenther | Nov. 12, 1935 |
| 2,058,586 | Heiss et al. | Oct. 27, 1936 |
| 2,139,569 | Alvarado | Dec. 6, 1938 |
| 2,141,689 | Eaton | Dec. 27, 1938 |
| 2,392,422 | Stephens | Jan. 8, 1946 |
| 2,450,161 | Price | Sept. 28, 1948 |
| 2,467,249 | Bobard | Apr. 12, 1949 |
| 2,775,429 | Ashton | Dec. 25, 1956 |
| 2,951,567 | Panhard | Sept. 6, 1960 |